United States Patent Office 3,133,033
Patented May 12, 1964

3,133,033
CURABLE TAR-RESORCINOL STILL RESIDUE EPOXY ETHER COMPOSITIONS
William E. St. Clair, Pittsburgh, and Margaret J. Waldron, Pitcairn, Pa., assignors to Koppers Company, Inc., a corporation of Delaware
No Drawing. Filed Dec. 23, 1958, Ser. No. 782,414
3 Claims. (Cl. 260—28)

This invention relates generally to a new use for resorcinol still residue and more particularly to a composition having as a component thereof an epoxy ether of resorcinol still residue and usable as a coating and joint sealer, and is a continuation-in-part of application Serial Number 708,342 which has become abandoned.

Resorcinol is widely used in the production of dye stuff, pharmaceuticals, plasticizers, textiles, resins, and rubber products. While resorcinol can be obtained from the distillation of natural resins, it is generally manufactured by the fusion of sodium m-benzene disulfonate with caustic soda. The crude product from this reaction is distilled to obtain purified resorcinol as distillate and a black tarry residue as the bottom.

The term "resorcinol still residue" is used herein to designate the tarry residue remaining after the distillation of crude resorcinol. Analysis of a typical sample of resorcinol still residue shows 55% trihydroxy diphenyls, plus minor amounts of resorcinol, dihydroxy diphenyl and monohydroxy diphenyls. The chief ingredient is o,p,m'-trihydroxy diphenyl having the following formula:

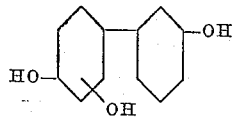

Resorcinol still residue epoxy ethers (glycidyl ethers of resorcinol still residue) are prepared by condensing resorcinol still residue with epichlorohydrin in the presence of a base. A preferred method of preparation involves the slow addition of alcoholic caustic to a mixture of resorcinol still residue and excess epichlorohydrin at about 90° C.–100° C. and thereafter removing the volatiles by distillation. Such method for the condensation of resorcinol with epichlorohydrin is disclosed in William E. St. Clair's application Serial Number 546,255 filed November 10, 1955, and now matured into Patent No. 2,892,849.

The condensation of resorcinol still residue with epichlorohydrin yields as a chief ingredient o,p,m'-tri (epoxy methoxy) diphenyl:

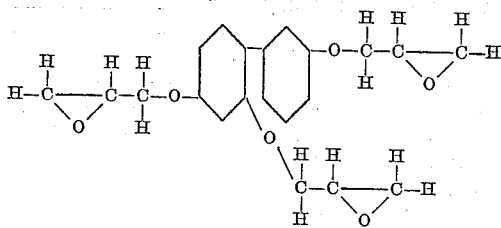

The condensate additionally contains some resorcinol diglycidyl ether and glycidyl ethers of the other phenols present.

It is an object of this invention to provide coating and plastic compositions exhibiting high resistance to attack by chemicals, solvents, moisture and high temperatures.

It is a further object of this invention to prepare coatings and joint sealers which adhere well to concrete, masonry, metal and wood.

The compositions of the present invention comprise a tar fraction, an epoxy ether of resorcinol still residue or resorcinol still residue and a phenolic aldehyde resin, and a curing agent having a plurality of active hydrogens reactive with the epoxy groups of the ether. The compositions desirably include inert solvents and inert fillers, and in the case of joint sealers, an elastomer. The curing agent reacts with the ether at room temperature to yield an insoluble resinous material.

The curing agent reacts with the epoxy ether of the resorcinol still residue at room temperature so that the products of the invention should be made up in the form of a two component composition, one component containing the curing agent, and the other component the resin. Since solvents, fillers, and tar fraction do not react with either component as long as the components are kept separated, they may be present in either component in any proportion so long as the total proportions are within the range of this invention.

The polyepoxy alkoxy phenolic aldehyde resins useful in the invention include resins such as described in U.S. Patents 2,658,884 and 2,658,885 which comprise the reaction product of a fusible alkylphenolic aldehyde resin, prepared by reacting an alkylphenol with from 0.5–0.8 mol of an aldehyde or ketone, as well as those of copending application Serial Number 708,518, filed January 13, 1958, now Patent No. 3,005,797.

The number of glycidyl or other epoxyalkoxy groups to be added depends on the properties desired in the final product. Satisfactory properties are often attained when much less than complete substitution of epoxyalkoxy groups for hydroxy groups is effected. With the higher molecular weight phenolic aldehyde resins, it is often desirable to have only a portion of the hydroxy groups replaced with epoxy containing alkyl chains and to maintain some hydroxy groups free for further reaction. The remaining hydroxy groups can be converted, if desired, by obvious reactions either prior to etherification with epoxy alkoxy groups or after the etherification step. The extent of substitution of epoxy alkoxy groups for hydroxy groups is controlled by the quantity of alkali that is added to the resorcinol still residue and phenolic-aldehyde resin in excess haloepoxy alkane.

The curing agents useful in the compositions of the present invention include difunctional or polyfunctional compounds such as polyamines, alcohol amines, polyamides or combinations of these with monoamines, containing groups having a plurality of nitrogen atoms with at least one hydrogen attached thereto that is reactive with the oxirane oxygen of the epoxy groups. The specific choice of active hydrogen containing curing agent will be determined by the desired pot life (the useful life of the mixed components during which they may be used or applied after mixing) and the final properties desired in the cured material. Representative compounds which may be used alone or as mixtures thereof are n-aminopropylmorpholine, 2,2-aminoethylaminoethanol, polyglycolamine, triethylenetetramine, toluenediamine, diethylenetriamine, toluenediamine in aniline, Versamids (di and trimerized fatty acids reacted with polyamines such as ethylene diamine), tetraethylene pentamine, penta ethylene hexamine, methyl amino propylamine and isopropyl amino propylamine.

The tar of the composition includes one or more of the following tar fractions: crude tar, road tar, coke oven heavy oil, creosote, topped tar, coal tar pitch and coal digestion pitch.

For coating compositions, the solvents, include, for example, ketones, esters, or aromatic solvents, such as methyl ethyl ketone, butyl acetate, coal tar naphtha, benzene, toluene, xylene, or mixtures thereof. For joint sealers, small amounts of these solvents or cresylic acids may be used.

The inert fillers include mica, asbestos, talc, powdered and flaked glass, slate dust, clay, alumina, and Carborundum.

If desired, elastomers or plasticizers which are soluble or dispersible in the tar fraction may be added to impart elasticity. Suitable ones include polyvinyl acetate, polyvinyl chloride, polyvinyl acetate chloride copolymers, polyvinyl acetals, polyvinyl alcohol, natural and synthetic rubbers, butadiene-acrylonitrile copolymers, butadiene-styrene copolymers, polyethylene polysulfides (Thiokols), nylon and polyamides such as the Versamids.

The Versamids function both as curing agents and as plasticizers.

The composition of the invention may comprise the following parts by weight:

| | |
|---|---|
| Resorcinol still residue epoxy ether | 10–90 |
| Curing agent | [1] 0.6–1.8 |
| Tar fraction | 90–10 |
| Elastomer | 0–50 |
| Filler | 0–80 |
| Solvent | 0–60 |

[1] Equivalents active hydrogen per oxirane oxygen in the resorcinol still residue epoxy ether.

The invention is further illustrated but not limited by the following examples wherein proportions are expressed as parts by weight:

Example I 269 parts of resorcinol still residue dissolved in 1480 parts of epichlorohydrin was heated to 95° C. in a vessel fitted with an agitator, thermometer, reflux condenser, and addition funnel, and 259 parts of solid potassium hydroxide of 84.6% purity dissolved in 800 grams of 95% ethanol was added dropwise over a period of two hours. The temperature rose to 105° C. in ten minutes and then started falling as distillate was withdrawn at the same rate at which the alkaline solution was added so as to maintain a constant volume in the reactor, until the temperature stabilized. The solution was filtered to remove the potassium chloride. The filtrate was heated to 160° C. at atmospheric pressure, and was maintained at 160° C. as a vacuum was applied to the solution until the vacuum reached 15 mm. absolute pressure. The residue in the vessel was resorcinol still residue epoxy ether having an oxirane oxygen content of 9.3 as compared with a theoretical content of about 9.7%.

Example II 269 parts of resorcinol still residue dissolved in 1295 parts of epichlorohydrin was heated to a temperature of 95° C. in the vessel of Example I and an alcoholic solution of 950 parts of methanol and 160 parts sodium hydroxide (14.5% by weight) was added dropwise over a period of one hour. At the end of five minutes, the temperature had dropped to less than 90° C., i.e. at the boiling point of the alcohol to keep the volume constant. At the end of the hour a solution of 235 parts of an acid catalyzed resorcinol formaldehyde resin dissolved in 370 parts of epichlorohydrin was added to the solution in the reactor. This solution was heated to reflux and 80 parts of sodium hydroxide dissolved in 470 parts of methanol was added slowly over a period of one hour. At the end of this period, the whole solution was refluxed for ½ hour, cooled and filtered to remove sodium chloride. The filtrate was heated to a temperature of 140° C. and vacuum applied until a pressure of 60 mm. at 140° C. was obtained. The partially etherified product had an oxirane oxygen content of 8% compared with a theoretical content of about 9%.

Example III 260 parts of resorcinol still residue and 236 parts of an acid catalyzed cresol formaldehyde resin dissolved in 1665 parts of epichlorohydrin was heated to a temperature of 95° C. in the vessel of Example I and an alcoholic solution of 240 parts of sodium hydroxide in 1425 parts of methanol was added dropwise over a period of two hours during which sufficient volatile matter was removed to maintain a constant volume in the reactor. At the end of this period, the solution was refluxed for an additional one half hour, then cooled and filtered to remove the sodium chloride. The filtrate was heated to a temperature of 140° C. and vacuum applied until a pressure of 60 mm. at 140° C. was obtained. The etherified product had an oxirane oxygen content of 8.6 compared with a theoretical content of about 9.4%.

Example IV

| | Parts |
|---|---|
| Resorcinol still residue epoxy ether | 62.4 |
| Coke oven heavy oil | 96 |
| Toluene diamine | 17.2 |
| Polyvinyl acetate | 24 |
| Pitch (96°) | 20 | are mixed to form a join sealer. The sealer cures at room temperature to yield an elastic sealer exhibiting excellent resistance to hydrocarbon solvents.

Example V

| | Parts |
|---|---|
| Resorcinol still residue epoxy ether | 62.4 |
| Toluene diamine | 17.2 |
| Pitch 96° | 20 |
| Polyvinyl acetate | 32 |
| Coke oven heavy oil | 128 |

A sealer thus prepared exhibits resistance to jet engine fuel. A sample after 48 hours immersion in jet fuel stretches 50% its original length at 0° F., and after compression to its original length at room temperature, stretches 50% again for two additional freeze-thaw cycles.

Example VI

| | |
|---|---|
| Resorcinol still residue epoxy ether | 18 |
| Polyvinyl acetal | 10 |
| Light crude tar | 70 |
| Diethyleneamine triamine | 2 | is mixed. The resulting composition cures at ambient atmospheric conditions to an elastic sealer at room temperature.

Example VII

| | |
|---|---|
| Resorcinol still residue epoxy ether | 135 |
| Thiokol LP-8 (polyethylene polysulfide) | 100 |
| Light crude tar | 100 |
| Diethylene triamine | 15 |

This composition cures at ambient atmospheric temperature to a joint sealer.

Example VIII

| | |
|---|---|
| Resorcinol still residue epoxy ether | 36 |
| Crude tar | 40 |
| Butadiene styrene copolymer (GR-S 1503) | 85 |
| Benzene | 15 |
| Diethylene triamine | 4 | are mixed to thoroughly disperse the GR-S in the tar. The benzene evaporates and the composition cures at ambient atmospheric conditions to a flexible joint sealer.

The following examples illustrate the preparation of coating compositions according to the present invention:

Example IX

| | |
|---|---|
| Resorcinol still residue epoxy ether | 25 |
| Toluene | 12.5 |
| Methyl ethyl ketone | 12.5 |
| Topped tar | 33.3 |
| Slate dust | 16.7 |
| Diethylene triamine | 4 |

The paint after evaporation of the solvent and curing at room temperature exhibits excellent resistance to solvents.

Example X

| | |
|---|---|
| Resorcinol still residue epoxy ether | 35 |
| Talc | 13.8 |
| Naphtha | 13.9 |
| Coal digestion pitch | 37.4 |
| Diethylene triamine | 3.5 |

The paint cures at room temperature to a coating to yield a corrosion resistant coating for metal structures.

Example XI

| | |
|---|---|
| Resorcinol still residue epoxy ether | 25 |
| Toluene | 12.5 |
| Methyl ethyl ketone | 12.5 |
| Topped tar | 33.3 |
| Slate dust | 16.7 |
| Diethylene triamine | 1 |
| Methylaminopropylamine | 1.3 |

The foregoing examples have been based on resorcinol still residue epoxy ether made in accordance with Example I. However, similar results are obtained by using the resin of Examples II and III.

If desired, the resorcinol still residue may be purified to yield a substantially pure fraction of trihydroxy diphenyls, primarily o,p,m'-trihydroxy diphenyl. The triglycidyl ether of o,p,m'-trihydroxy diphenyl is then prepared in the manner discussed above. The following example discloses an excellent joint sealer prepared from this glycidyl ether:

Example XII

| | Parts |
|---|---|
| Triglycidyl ether of o,p,m'-trihydroxy diphenyl | 62.4 |
| Coke oven heavy oil | 96 |
| Toluene diamine | 17.2 |
| Polyvinyl acetate | 24 |
| Pitch (96°) | 20 |

The foregoing has presented a novel composition which can be used as a joint sealer and as a protective coating. The novel composition provides a useful product from the still residue from the distillation of crude resorcinol.

What is claimed is:

1. A composition comprising 10–90 parts by weight of a tar fraction selected from the group consisting of crude tar, road tar, coke oven heavy oil, creosote, topped tar, coal tar pitch, and coal digestion pitch, 10–90 parts by weight of a polyglycidyl ether of resorcinol still residue which contains as a major constituent trihydroxy diphenyls and as minor constituents resorcinol, dihydroxy diphenyls, and monohydroxy diphenyls and which has been obtained as the tarry residue bottom from the distillation of the crude resorcinol that is produced by the fusion of sodium m-benzene sulfonate with caustic soda, and a curing agent having a plurality of active hydrogen atoms reactive with the glycidyl groups of said polyglycidyl ether and chosen from the class consisting of polyamines and polyamides to provide 0.6–1.8 equivalents of active hydrogen per glycidyl group of said polyglycidyl ether.

2. A joint sealer composition comprising 10–90 parts by weight of a tar fraction selected from the group consisting of crude tar, road tar, coke oven heavy oil, creosote, topped tar, coal tar pitch, 10–90 parts by weight of a polyglycidyl ether of resorcinol still residue which contains as a major constituent trihydroxy diphenyls and as minor constituents resorcinol, dihydroxy diphenyls, and monohydroxy diphenyls and which has obtained as the tarry residue bottom from the distillation of the crude resorcinol that is produced by the fusion of sodium m-benzene sulfonate with caustic soda, a curing agent having a plurality of active hydrogen atoms reactive with glycidyl groups of said polyglycidyl ether and chosen from the class consisting of polyamines and polyamides to provide 0.6–1.8 equivalents of active hydrogen per glycidyl group of said polyglycidyl ether, and less than about 50 parts by weight of an elastomer.

3. A composition comprising from 10–90 parts by weight of a tar fraction selected from the group consisting of crude tar, road tar, coke oven heavy oil, creosote, topped tar, coal tar pitch, and coal digestion pitch, 10–90 parts by weight of a polyglycidyl ether of resorcinol still residue which is a condensation product of epichlorohydrin in the presence of a base with the tarry residue obtained from the distillation of crude resorcinol produced by fusion of sodium m-benzene disulfonate with caustic soda, and a curing agent chosen from the group consisting of polyamines and polyamides and having a plurality of active hydrogen atoms reactive with the glycidyl groups of said polyglycidyl ether to provide 0.6–1.8 equivalents of active hydrogen per glycidyl group.

References Cited in the file of this patent

UNITED STATES PATENTS

| | | |
|---|---|---|
| 2,528,417 | Bradley | Oct. 31, 1950 |
| 2,599,817 | Evans et al. | June 10, 1952 |
| 2,728,734 | Cubberley et al. | Dec. 27, 1955 |
| 2,753,312 | Miller | July 3, 1956 |

OTHER REFERENCES

Lee et al.: Epoxy Resins (1957), McGraw-Hill Book Company, Inc. (page 41).